(12) United States Patent
Kitayama et al.

(10) Patent No.: US 8,165,913 B2
(45) Date of Patent: Apr. 24, 2012

(54) SYSTEM, METHOD, PROGRAM FOR ASSIGNING VIRTUAL ATTRIBUTE TO PRODUCT, AND SYSTEM, METHOD, AND PROGRAM FOR TRACING CAUSE OF PHENOMENON OCCURRING IN PRODUCT

(75) Inventors: Fumihiko Kitayama, Sagamihara (JP); Hirofumi Matsuzawa, Sagamihara (JP); Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 1264 days.

(21) Appl. No.: 11/845,330

(22) Filed: Aug. 27, 2007

(65) Prior Publication Data

US 2008/0059259 A1 Mar. 6, 2008

(30) Foreign Application Priority Data

Aug. 31, 2006 (JP) .................. 2006-236630

(51) Int. Cl.
*G06F 17/50* (2006.01)
(52) U.S. Cl. ...................... 705/7.41; 700/110
(58) Field of Classification Search .............. 705/7.41; 700/110
See application file for complete search history.

(56) References Cited

U.S. PATENT DOCUMENTS

| | | | | |
|---|---|---|---|---|
| 6,223,097 B1 * | 4/2001 | Hashimoto et al. | ........... | 700/223 |
| 6,535,776 B1 * | 3/2003 | Tobin et al. | .................. | 700/110 |
| 6,625,511 B1 * | 9/2003 | Suzuki et al. | ................ | 700/110 |
| 6,816,751 B1 * | 11/2004 | Alice et al. | ................... | 700/222 |
| 7,567,948 B2 * | 7/2009 | Kitayama et al. | ............... | 706/62 |
| 7,725,849 B2 * | 5/2010 | Abercrombie et al. | ........ | 716/136 |
| 7,769,706 B2 * | 8/2010 | Kitayama et al. | ............... | 706/62 |
| 2002/0128910 A1 * | 9/2002 | Sakuma | .......................... | 705/14 |
| 2002/0138503 A1 * | 9/2002 | Buesing et al. | ............... | 707/203 |
| 2003/0172013 A1 * | 9/2003 | Block et al. | ..................... | 705/33 |
| 2005/0071029 A1 * | 3/2005 | Yamamoto et al. | ............. | 700/97 |
| 2005/0222817 A1 * | 10/2005 | Achacoso et al. | ............ | 702/185 |

(Continued)

FOREIGN PATENT DOCUMENTS

JP 1991104559 5/1991

(Continued)

OTHER PUBLICATIONS

Chen, et al. "A Novel Manufacturing Defect Detection Method Using Association Rule Mining Techniques." Expert Systems with Applications, 29 (2005) 807-815.*

(Continued)

*Primary Examiner* — Susanna M Meinecke
(74) *Attorney, Agent, or Firm* — Gibb I.P. Law Firm, LLC; Richard M. Kotulak, Esq.

(57) ABSTRACT

A system for tracing a cause of a phenomenon occurring in products produced in a production process chain is provided. The system is provided with a storage unit for storing a virtual attribute in association with corresponding second products, a receiving unit for receiving information for specifying third products in which a phenomenon occurs, a correlation calculation unit for calculating a correlation coefficient between the third products specified by the information for specifying the third products and the group of the second products having a common virtual attribute, for every kind of second products used in the third products, and a cause identification unit for identifying the second products belonging to the kind of the second products for which a maximum correlation coefficient is calculated as the cause of the phenomenon.

8 Claims, 8 Drawing Sheets

| A3 PARTS LOT NUMBER | A2 PARTS LOT NUMBER | A1 PARTS LOT NUMBER | A0 PRODUCT LOT NUMBER | FAILURE INFORMATION |
|---|---|---|---|---|
| A3-X01 | A2-X01 | A1-X01 | A0-001 | |
| A3-X01 | A2-X02 | A1-X01 | A0-001 | i=1 |
| A3-X01 | A2-X02 | A1-X01 | A0-001 | i=2 |
| A3-X01 | A2-X02 | A1-X02 | A0-001 | i=3 |
| A3-X01 | A2-X02 | A1-X02 | A0-001 | i=4 |
| A3-X01 | A2-X03 | A1-X03 | A0-001 | |
| A3-X01 | A2-X03 | A1-X03 | A0-001 | |
| A3-X01 | A2-X03 | A1-X04 | A0-001 | |
| A3-X01 | A2-X03 | A1-X04 | A0-002 | |
| A3-X01 | A2-X03 | A1-X04 | A0-002 | |
| A3-X02 | A2-X03 | A1-X05 | A0-002 | |
| A3-X02 | A2-X04 | A1-X05 | A0-002 | i=5 |
| A3-X02 | A2-X04 | A1-X05 | A0-002 | i=6 |
| A3-X02 | A2-X04 | A1-X05 | A0-002 | i=7 |
| A3-X02 | A2-X04 | A1-X05 | A0-002 | i=8 |
| A3-X02 | A2-X04 | A1-X06 | A0-002 | i=9 |
| A3-X02 | A2-X04 | A1-X06 | A0-002 | i=10 |
| A3-X02 | A2-X05 | A1-X06 | A0-002 | |
| A3-X02 | A2-X05 | A1-X07 | A0-003 | |

210     220     240

U.S. PATENT DOCUMENTS

| | | | |
|---|---|---|---|
| 2005/0256788 A1* | 11/2005 | Mukai | 705/29 |
| 2006/0095915 A1* | 5/2006 | Clater | 718/100 |
| 2007/0230770 A1* | 10/2007 | Kulkarni et al. | 382/149 |
| 2008/0005110 A1* | 1/2008 | Tsuda | 707/7 |
| 2009/0306922 A1* | 12/2009 | Toyoshima | 702/83 |

FOREIGN PATENT DOCUMENTS

| | | |
|---|---|---|
| JP | 2001210781 | 8/2001 |
| JP | 2005235150 | 2/2002 |
| JP | 2002251212 | 9/2002 |
| JP | 2002361527 | 12/2002 |
| JP | 2005215768 | 8/2006 |
| JP | 2006-337376 A * | 12/2006 |

OTHER PUBLICATIONS

Fast Algorithms for Mining Association Rules, Agrawal et al., IBM Almaden Research Center, Visiting from the Department of Computer Science, University of Wisconsin, Madison.

Mining Generalized Association Rules, Srikant et al., IBM Almaden Research Center, Department of Computer Science, University of Wisconsin, Madison, Proceedings of the 21st VLDB Conference, Zurich, Switzerland, 1995.

* cited by examiner

SYSTEM, METHOD, PROGRAM FOR ASSIGNING VIRTUAL ATTRIBUTE TO PRODUCT, AND SYSTEM, METHOD, AND PROGRAM FOR TRACING CAUSE OF PHENOMENON OCCURRING IN PRODUCT

CROSS REFERENCES TO RELATED APPLICATIONS

This application is related to Japanese Patent Application No. 2006-236630, filed Aug. 31, 2006.

FIELD OF THE INVENTION

The present invention relates generally to an information processing technology, and more particularly, to a system, a method, and a program for assigning a virtual attribute to products, and a system, a method, and a program for tracing a cause of a phenomenon occurring in products.

In recent years, social concerns about a fault or defect resulting from design and production processes of products, especially consumer products (in this specification, referred to as only "fault") are increasing. If such a fault should occur, means for specifying a cause of the fault is required in order for a company to take measures, such as a recall or the like, quickly and in the required range.

In particular, in order to avoid unnecessary costs and delay of necessary actions which cause the disrepute of social credibility of the company, it is necessary to concretely and quickly specify what parts are involved in the cause of the fault, among the parts used in the products in which the fault occurs.

As a method for specifying the cause of such a fault, there is considered a method of performing a correlation analysis between products in which the fault occurred and an attribute of the parts used in the products by using an existing data mining technique (as an example of the data mining technique, refer to "Fast Algorithms for Mining Association Rules" by Agrawal and Srikant*, (IBM Almadan Research Center, Department of Computer Science, University of Wisconsin, Madison*) and "Mining Generalized Association Rules" by Agrawal and Srikant*, (IBM Almadan Research Center, Department of Computer Science, University of Wisconsin, Madison*).

The following Japanese Unexamined Patent Publications are also provided as background.

Japanese Unexamined Patent Publication (Kokai) No. 2005-235150, "IC Tag Inclusion Body and Manufacturing Method Therefor" (Applicant: DARUMAYA, Inventor: Naoki, et al., Published Feb. 9, 2005) discloses a data trace system of production/development information for finding a cause of a quality defect during mass production. The system registers an operation number and a parts number as link information, and in the development process, it registers FMEA information linked to the operation number and the parts number for every production process and every part. After determining the specifications, the system registers a production specification or the like as process specification information, and a design specification or the like as parts specification information, linking them to the operation number and the parts number, respectively, and in the production process, it registers quality information, linking it to the production lot number and the operation number thereof.

Japanese Unexamined Patent Publication (Kokai) No. 2002-361527, "Arrangement System" (Applicant: Hitachi, Ltd., Inventor Norihiro et al., Published: Dec. 18, 2002) discloses a system for dealing with the problem that a quality tracing becomes difficult when the quality varies depending on compatibility between the parts. The system is provided with a bill of materials, a list indicating whether or not a combination of parts is allowed, a quality analysis unit, a storage parts database for storing information on parts on a lot basis, a rank master for passing compatibility information on a parts to the storage parts database, a combination calculating section for determining a combination and calculating the number of starting processes for every combination, a starting process recording system for instructing parts to be used for every parts supply basis, and a quality trace database for storing quality data on the product for every above-described parts supply basis.

Japanese Unexamined Patent Publication (Kokai) No. 2002-251212, "Method for Quality Control and System for the Same and Recording Medium With its Program Recorded" (Applicant: Toyota Motor Corporation, Inventor: Hidekatsu, Published: Jun. 9, 2002) discloses a method aiming at a means for specifying whether the cause of quality defect of the higher level parts is resulted from the defect of the individual lower level parts constituting the higher level parts or from the problem of the assembly process thereof.

SUMMARY OF THE INVENTION

When data mining of an attribute of parts is performed to identify a cause of a fault of products, such as cars composed of tens of thousands of parts or the like, a large amount of computer resources may be required. Specifically, when a product includes, for example, 100,000 parts, each having ten attributes, performing the data mining in consideration of all of the attributes increases the basket size for performing a basket analysis to the order of 1 million in number. When this is applied to a large number of products (for example, 3 million cars), it will be clear that a large amount of computer resources (for example, memory size) may be required.

It is an object of the present invention to provide a system, a method, and a program for assigning a virtual attribute to products, and a system, a method, and a program for tracing more efficiently a cause of a phenomenon occurring in the products.

In order to achieve the above-described object, there is provided a system for assigning a virtual attribute to products produced in a production process chain in which producing products using parts supplied from a lower level supplier and supplying produced products to a higher level supplier as parts are repeatedly assembled in each step. The production process chain includes a first supplier producing first products and a second supplier being a higher level supplier than the first supplier and producing second products. The system is provided with a storage unit for storing a first attribute value assigned to the group of first products having a common attribute, a storage unit for storing a second attribute value assigned to the group of second products having a common attribute, and a generation unit for generating a unique virtual attribute value to a combination of the second attribute value and one or more first attribute values respectively assigned to one or more first products used in the corresponding second products.

Moreover, in order to achieve the above-described object, there is provided a system for tracing, by means of using the virtual attribute value generated in the system for assigning the above-described virtual attribute, a cause of a phenomenon occurring in third products which a third supplier, being a higher level supplier than the second supplier produces, using a plurality of kinds of the second products. The system is provided with a storage unit for storing the virtual attribute value in association with the corresponding second products; a receiving unit for receiving information for specifying the third products in which the phenomenon has occurred; a correlation calculation unit for calculating a correlation coefficient between the third products specified by the information for specifying the third products and a group of the second products having the common virtual attribute, for every kind of second products used in the third products; and a cause identification unit for identifying the second products belonging to the kind of the second products for which a maximum correlation coefficient is calculated as the cause of the phenomenon.

As described above, while the summary of the present invention has been described as a system, the present invention can be a method, a program, or a program product thereof. The program product can include, for example, a storage medium for storing the above-mentioned program, or a medium for transmitting the program.

It should be noted that the above-described summary of the present invention does not enumerate all of the features required for the present invention, and a combination of the parts or a subcombination thereof could also be included in the present invention.

DETAILED DESCRIPTION

Hereinafter, while the best mode for carrying out the present invention will be described in detail based on the drawings, the following embodiments do not limit the invention according to the claims, and also, all of combinations of features described in the embodiments are not essential in order to solve problems of the invention.

In addition, the present invention can be carried out in many different modes and should not be construed as limited to contents of description in the embodiments. It should also be noted that all of the combinations of the features described in the embodiments are not essential to the invention. The same numerals are given to same elements throughout the description in the embodiments.

Figure 1:
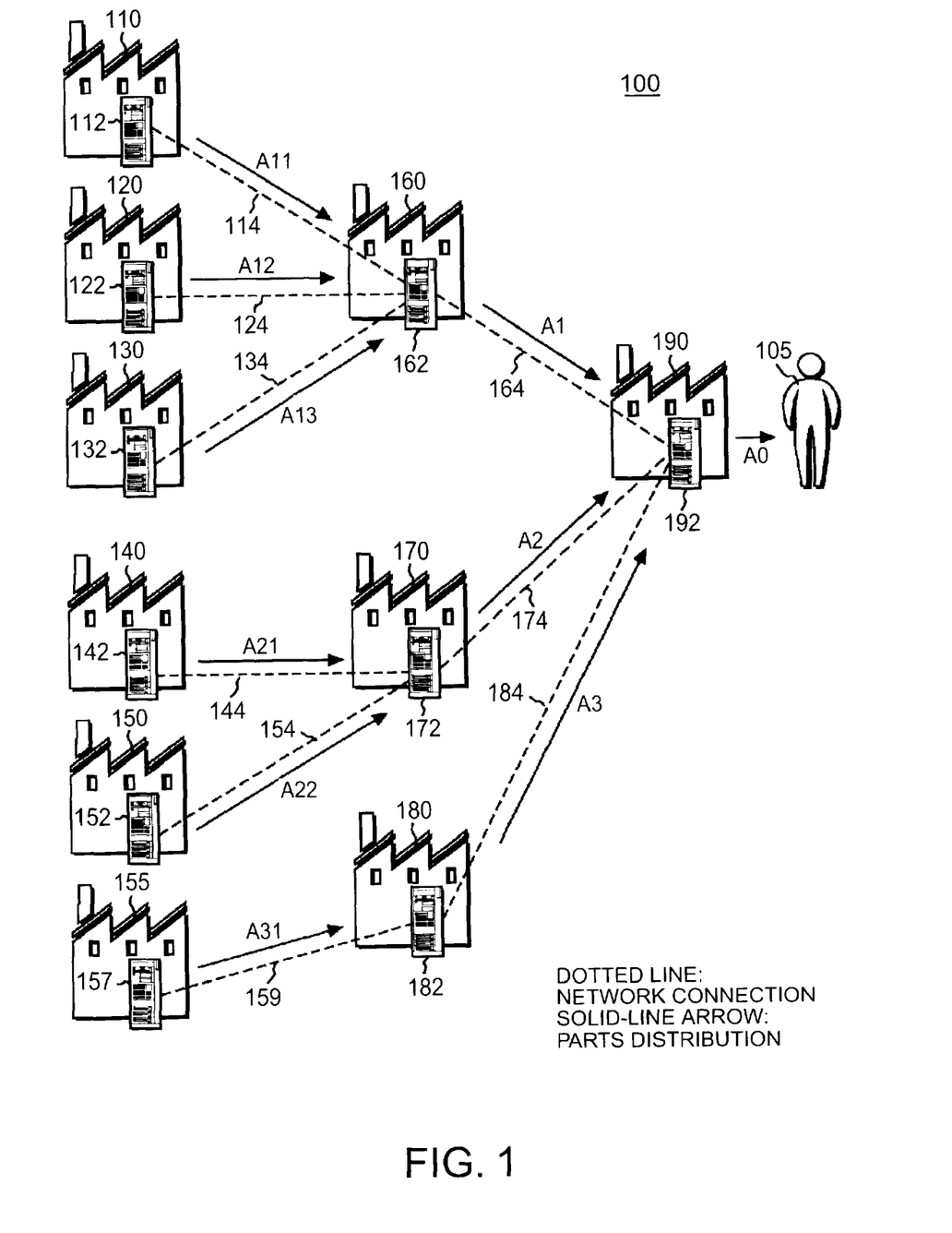
FIG. 1 is a high-level conceptual diagram of a production process chain of an embodiment of the present invention.

FIG. 1 is a high-level schematic diagram illustrating a production process chain 100 according to an embodiment of the present invention. The production process chain 100 according to this embodiment of the present invention includes a plurality of suppliers 110, 120, 130, 140, 150, 155, 160, 170, 180, and 190 (in this specification, they may be referred to as only a "supplier", respectively).

The supplier included in the production process chain 100 according to this embodiment of the present invention produces products using parts supplied from a lower level supplier, and supplies the produced products as parts to a higher level supplier. Repeating this cycle produces final products to be sold to consumers.

Specifically, in an embodiment of the present invention, the suppliers 110, 120, and 130 will produce products A11, A12, and A13, respectively, and supply them to the higher level supplier 160 as the parts. The supplier 160 will produce products A1 by using parts A11, A12, and A13 and supply the produced products as parts to the supplier 190 which produces the end products.

The suppliers 140 and 150 will produce products A21 and A22, respectively, and supply them as parts to the higher level supplier 170. The supplier 170 will produce products A2 by using the parts A21 and A22 and supply the produced products as parts to the supplier 190.

The supplier 155 will produce products A31, and supply the produced products as parts to the higher level supplier 180. The supplier 180 will produce products A3 by using the parts A31 and supply them as parts to the supplier 190. The supplier 190 produces end products A0 by using the parts A1, A2, and A3, and consumers 105 will purchase and use the sold final products A0.

Figure 8:
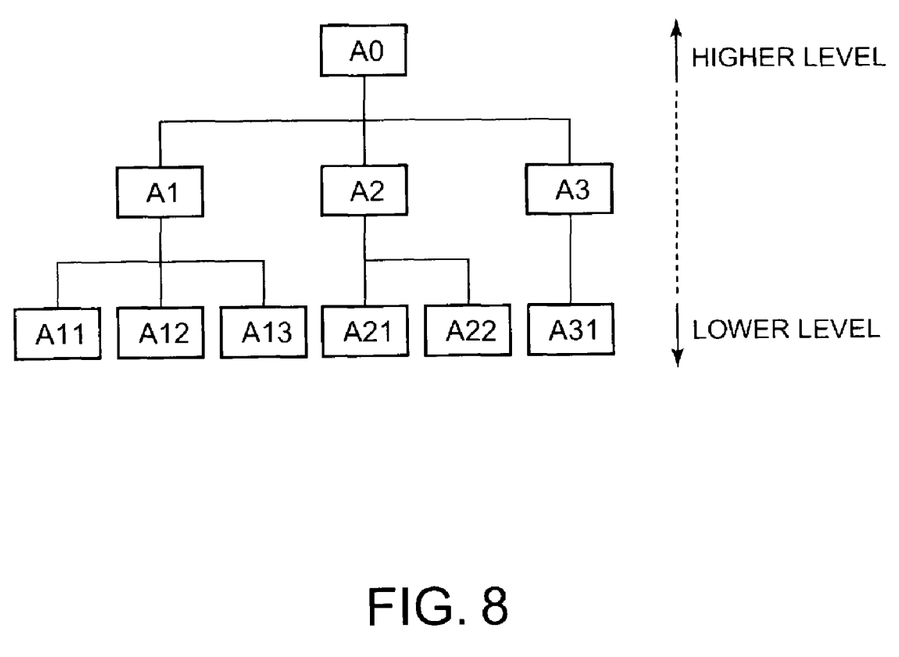
FIG. 8 is a bill of materials of an end-product in an embodiment of the present invention.

FIG. 8 illustrates a bill of materials (BOM) of the end product A0 according to an embodiment of the present invention. In this specification, a product positioned at a relatively higher level in the bill of materials and a product positioned at a relatively lower level in the bill of materials are referred to as a "higher level product" and a "lower level product", respectively, and suppliers producing the "higher level product" and the "lower level product" are referred to as a "higher level supplier" and a "lower level supplier," respectively.

Respective suppliers are provided with systems 112, 122, 132, 142, 152, 157, 162, 172, 182, and 192 (in this specification, and each of these systems may be referred to as simply a "system", respectively) for managing information on the products produced by the respective suppliers.

The system that each supplier has stores product information inputted by an operator in the company or automatically generated in its own system, another production management system, or the like. Moreover, a user of the system can read the product information stored in the system through a display device that the system has.

Furthermore, the product information stored in the system includes, for example, a production schedule of the products of the supplier provided with the system, an operator (identification) in the production process, a condition in the production process, a lot number, fault information of the products for specifying products causing a fault, or the like.

Respective systems are connected with the systems (in this specification they are referred to as a "higher level system" and "lower level system", respectively) provided in the higher level and lower level suppliers through a communication network, thereby making it possible to exchange electronic data. Specifically, system 192 can communicate with the lower level systems 162, 172, and 182 through networks 164, 174, and 184.

The system 162 can communicate with the lower level systems 112, 122, and 132 through networks 114, 124, and 134. The system 172 can communicate with the lower level systems 142 and 152 through networks 144 and 154. The system 182 can communicate with the lower level system 157 through a communication network 159.

The above-mentioned communication networks 114, 124, 134, 144, 154, 157, 164, 174, and 184 (in this specification, they are referred to as a "network") can be achieved by the Internet as an example. The Internet interconnects the systems by using a well-known TCP/IP. On the Internet, the systems communicating with each other are identified based on an IP address represented with a global address or a local address. In an embodiment of the present invention, the network connection between systems is achieved using a well-known virtual private network (VPN) to improve security.

In an embodiment of the present invention, the system can receive the information on the products supplied as parts from the lower level system. Moreover, the system can transmit the information on the products supplied as parts to the higher level system.

Additionally, in an embodiment of the present invention, the system can receive the fault information on the products supplied as parts from the higher level system through the network. The system can also transmit the fault information of the product supplied as the parts to the lower level system.

Figure 2:
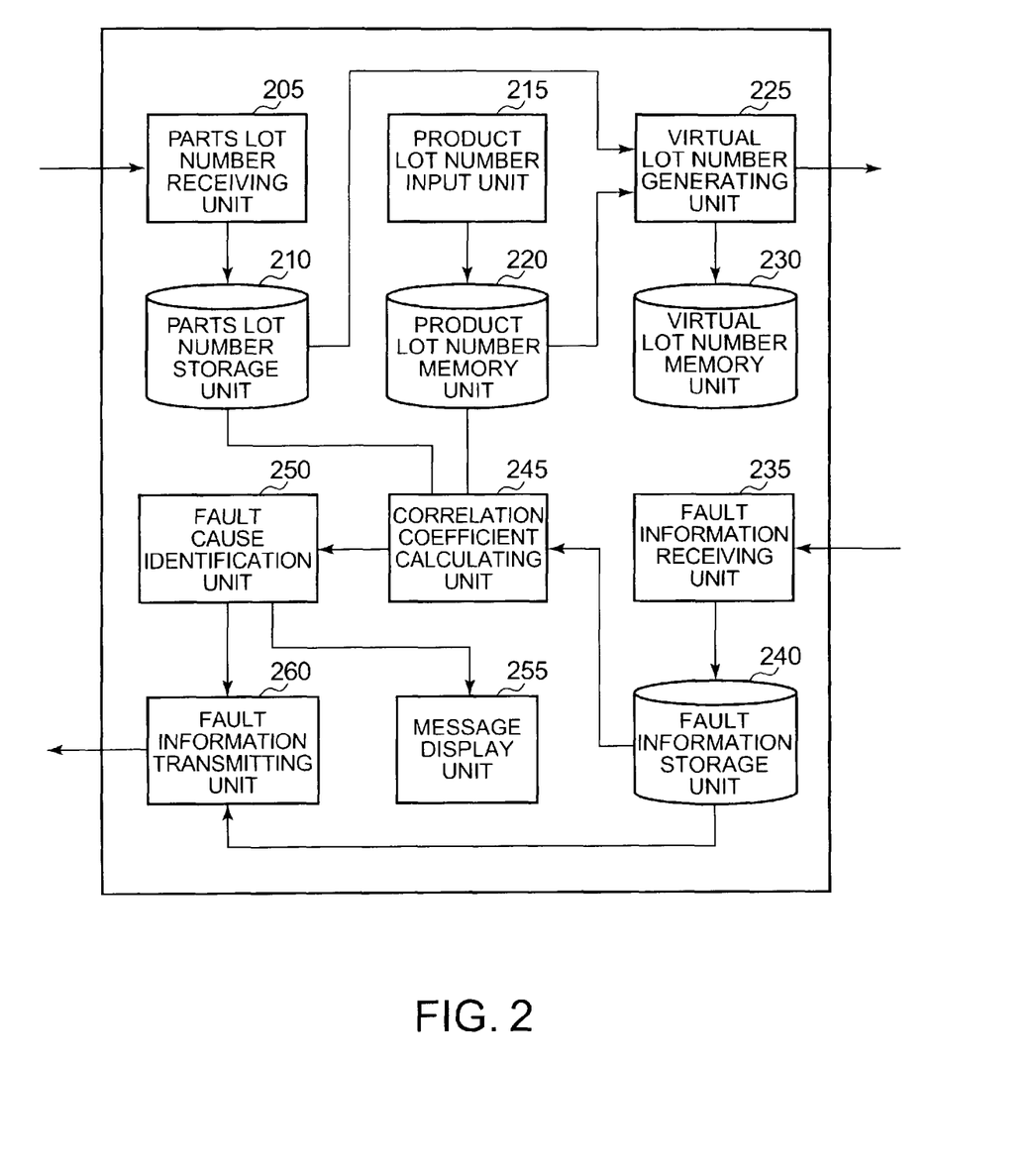
FIG. 2 is a functional block diagram of a system in an embodiment of the present invention.

FIG. 2 is a functional block diagram of the system according to an embodiment of the present invention. It should be noted that each unit shown in the functional block diagram of FIG. 2 can be achieved by loading an operating system and a computer program stored in a hard disk drive 13 to a main memory 4 to then cause a CPU 1 to read them and hardware resources and software to collaborate with each other in the information processing apparatus having a hardware configuration shown in FIG. 7.

In an embodiment of the present invention, the system is provided with a parts lot number receiving unit 205, a parts lot number storage unit 210, a product lot number input unit 215, a product lot number storage unit 220, a virtual lot number generating unit 225, and a virtual lot number storage unit 230.

The parts lot number receiving unit 205 has a function to receive the lot number of the products supplied as the parts from the lower level supplier (in this specification, referred to as "parts lot number"), from the lower level system through the network. The lot number according to this invention will mean an attribute value assigned to the group of products of the same kind having a common attribute. The parts lot number storage unit 210 can store the parts lot number received by the parts lot number receiving unit 205.

More specifically, when the lower level supplier is the lowest level supplier in the production process chain 100, the parts lot number will be a manufacturing lot number assigned to the parts by the lower level supplier.

Incidentally, the manufacturing lot number is a lot number assigned to the group of the products having a common predetermined condition in the production process. Specifically, the same manufacturing lot number is assigned to, for example, the group of the products produced by the same operator, the group of the products produced using the same manufacturing equipment, or the like. Hence, it should be noted that the products assigned to the same manufacturing lot number as that of the products causing a fault has a high possibility of having the same cause of failure.

Meanwhile, when the lower level supplier is not the lowest level supplier in the production process chain 100, the parts lot number will be the virtual lot number assigned to the parts by the lower level supplier. Details of the virtual lot number in an embodiment of the present invention will be described hereinafter.

The product lot number input unit 215 has a function to receive an input of the manufacturing lot number of the products (in this specification, referred to as a "product lot number") produced using the parts supplied from the lower level supplier. The product lot number may be inputted, for example, by the operator through manual operation from a terminal in the production process of the products, or the input may be automatically received from another production information control system. The product lot number storage unit 220 can store the product lot number received by the product lot number input unit 215.

The virtual lot number generation unit 225 has a function to generate a virtual lot number based on the product lot number of the product and the parts lot number of the parts used in the products, as the virtual attribute of the products produced in the supplier provided with the system. More specifically, in the embodiment of the present invention, the virtual lot number generating unit 225 will assign and generate a unique virtual lot number for the combination of one or more lot numbers of one or more parts used in the products and the product lot number of the products.

The virtual lot number generating unit 225 further has a function to transmit the virtual lot number of the products supplied as the parts to the system of the higher level supplier to which the produced products are supplied as the parts. The virtual lot number storage unit 230 can store the virtual lot number generated by the virtual lot number generating unit 225.

The system is further provided with a fault information receiving unit 235, a fault information storage unit 240, a correlation coefficient calculating unit 245, a fault cause identification unit 250, a message display unit 255, and a fault information transmitting unit 260.

The fault information receiving unit 235 has a function to receive the fault information which is inputted by the operator based on a report from the consumer or the like, or is transmitted from the higher level system. The fault information storage unit 240 can store the fault information received by the fault information receiving unit 235. This fault information includes, at a minimum, information to specify the products causing the fault among the products shipped from the supplier to sell to the consumer, or the products supplied as the parts to the higher level supplier.

The correlation coefficient calculating unit 245 uses the parts lot number stored in the parts lot number storage unit 210 or the product lot number stored in the product lot number storage unit 220 to calculate the correlation coefficient between the products causing the specified fault using the information stored in the fault information storage unit 240, and the group of the parts having the common parts lot number and the group of the products having the common product lot number. Details concerning the calculation of this correlation coefficient will be described hereinafter.

The fault cause identification unit 250 has a function to identify the parts or the products corresponding to the lot number that meets predetermined conditions as the cause of the fault, based on the correlation coefficient calculated by the correlation coefficient calculating unit 245. Specifically, the fault cause identification unit 250 identifies the parts or the products having the maximum correlation coefficient calculated by the correlation coefficient calculating unit 245 as the cause of the fault.

The message display unit 255 has a function to display the information on the parts or the products identified as the cause of the fault by the fault cause identification unit 250 to the user of the system. The fault information transmitting unit 260 has a function that when the fault cause identification unit 250 identifies not the products but the parts as the cause of the fault, the fault information is provided to the lower level supplier that has supplied the parts.

Figure 3:
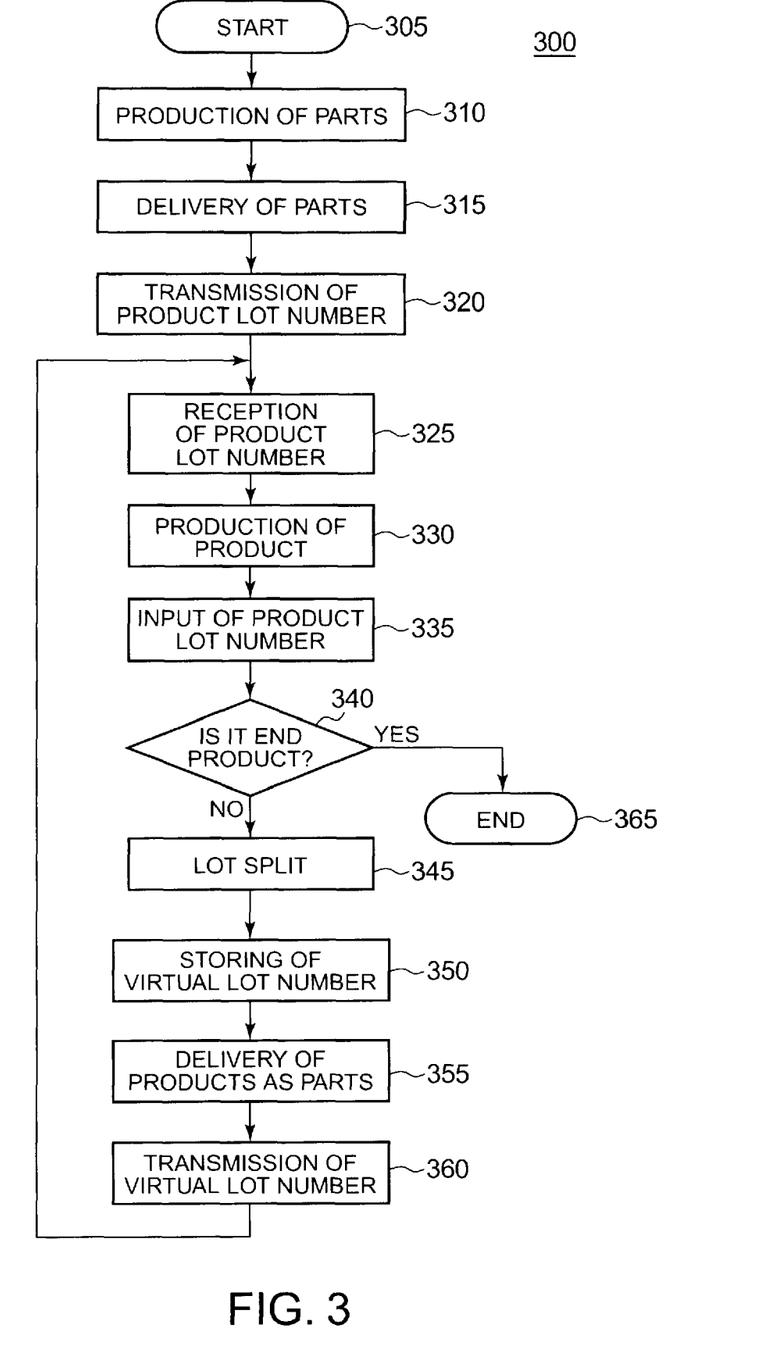
FIG. 3 is a flow chart for explaining operation in an assignment of a virtual lot number in the system according to an embodiment of the present invention.

FIG. 3 is a flow chart 300 representing an operation of the system in the product production phase in the embodiment of the present invention. The process is started at Step 305 and the production of the products in the lowest level supplier is carried out at Step 310. In an embodiment of the present invention, the production of parts/products A11, A12, A13, A21, A22, and A31 in the suppliers 110, 120, 130, 140, 150, and 155 is carried out.

Next, the products produced at Step 310 are supplied as the parts to the higher level supplier at Step 315. In an embodiment of the present invention, parts/products A11, A12, and A13 are supplied to the supplier 160; parts/products A21 and A22 to the supplier 170; and parts/products A31 to the supplier 180, respectively.

The process proceeds to Step 320, and the product lot number of the products supplied as the parts at Step 315 is transmitted. In an embodiment of the present invention, the product lot numbers of products A11, A12, and A13 are transmitted from the system 112 to the system 162; the product lot numbers of products A21 and A22, from the system 122 to the system 172; and the product lot number of products A31, from the system 157 to the system 182, respectively.

Next, at Step 325, the parts lot number receiving unit 205 receives the product lot number transmitted at Step 320 as the parts lot number. The received parts lot number is stored in the parts lot number storage unit 210. In an embodiment of the present invention, the parts lot number receiving units 205 of the systems 162, 172, and 182 receive the parts lot numbers.

The process proceeds to Step 330, and the supplier produces the products using the parts supplied at Step 315. The product lot numbers of the produced products are then inputted using the product lot number input unit 215 of the system, respectively, and stored in the product lot number storage unit 220 at Step 335. In an embodiment of the present invention, the products A1 are produced using parts A11, A12, and A13 in the supplier 160, the products A2 are produced using parts A21 and A22 in the supplier 170, the products A3 are produced in the supplier 180, and respective lot numbers are inputted and stored.

Furthermore, at Step 340, the process determines whether or not the products produced at Step 330 are end products to be provided to the consumer 105, namely, there is any further higher level supplier. If it is determined not to be the end products, the process proceeds to Step 345 through the arrow of NO. In an embodiment of the present invention, since there is the further higher level supplier 190 at this point, the process will proceed to Step 345.

At Step 345, the virtual lot number generating unit 225 assigns a new lot number (in this specification, referred to as a "virtual lot number") to the combination of the parts lot number stored in the parts lot number storage unit 210 with respect to one or more parts used in the products produced at Step 330, and the product lot number of the products stored in the product lot number storage unit 220. This process is referred to as a "lot split" in an embodiment of the present invention.

The lot split process in the system 162 according to an embodiment of the present invention will be described in detail as an example. As described above, A11, A12, and A13 will be used to produce A1 in supplier 160 according to an embodiment of the present invention. In the system 162, a uniquely identified virtual lot number is assigned to the combination of the respective parts lot numbers of A11, A12, and A13 and the product lot number of A1.

Figure 5:
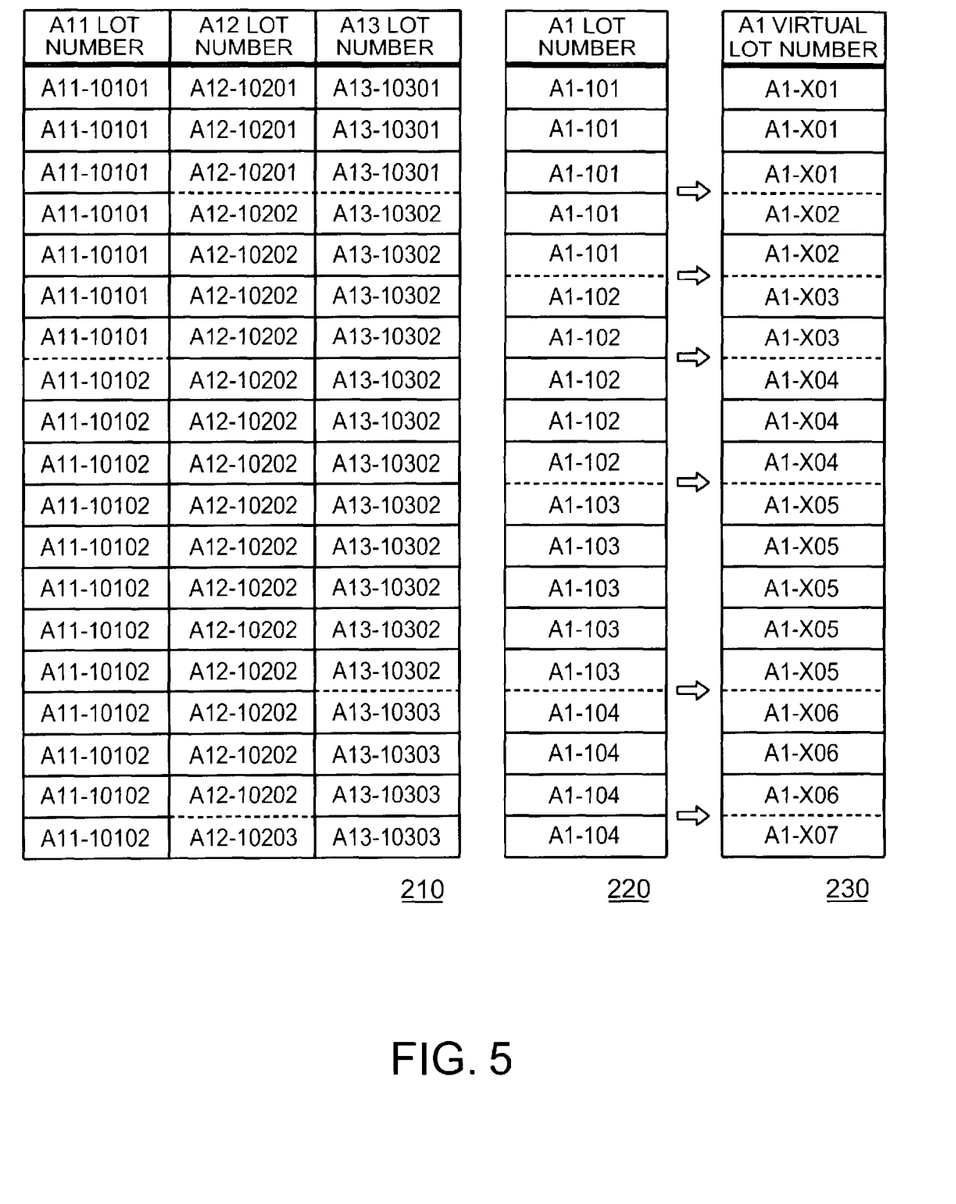
FIG. 5 is a diagram for explaining a lot split process in an embodiment of the present invention.

FIG. 5 illustrates an example of the lot split process in the system 162 according to an embodiment of the present invention. In FIG. 5, it should be noted that a unique virtual lot number "A1-X01" is assigned to a combination of three parts lot numbers "A11-10101", "A12-10201", and "A13-10301", and one product lot number "A1-101", for example.

As described in an embodiment of the present invention that the numbers per one lot (namely, lot size) of the product A1 and the parts A11, A12, and A13 are the same. However, since there are often cases where the parts are produced under the same condition in quantities larger than the products that uses them (for example, a case where thousands of semiconductor chips are produced as one lot and one of the chips is used in one device, or the like), and the lot size of the parts is much larger than that of the products, it should be noted that the number of virtual lot numbers is, in many cases, less than that shown in FIG. 5 in many cases.

The process proceeds to Step 350, and the virtual lot number generated by the virtual lot number generating unit 225 at Step 345 is stored in the virtual lot number storage unit 230. Next, the products to which the virtual lot number is assigned are further supplied as the parts to the higher level supplier (the supplier 190 in the embodiment of the present invention) at Step 355.

The process proceeds to Step 360, and the virtual lot number generating unit 225 transmits the virtual lot number generated at Step 345 to the system 192 of the supplier 190 to which the products corresponding to the virtual lot number are supplied as the parts at Step 355.

Incidentally, it should be noted that the virtual lot number generating unit 225 of the system 162 transmits only one virtual lot number rather than four lot numbers corresponding to parts/products A11, A12, A13, and A1 at Step 360 for one parts/products A1 supplied to the supplier 190. Namely, in an embodiment of the present invention, the amount of data that the system 162 must transmit, and the system 192 must receive and store is reduced as compared with the case of transmitting four lot numbers, and thus the amount of required computer resources will be relatively reduced remarkably. Moreover, it should be noted that the system according to an embodiment of the present invention could treat the received virtual lot number as the parts lot number without the need for any customization.

The process returns to Step 325, and the steps from Step 325 and thereafter are repeated in the supplier 190 or the system 192 using the virtual lot number transmitted at Step 360 as the parts lot number. Since supplier 190 is the highest level supplier that produces the end products, the process proceeds to Step 365 through the arrow of YES at Step 340 to be completed.

Figure 4:
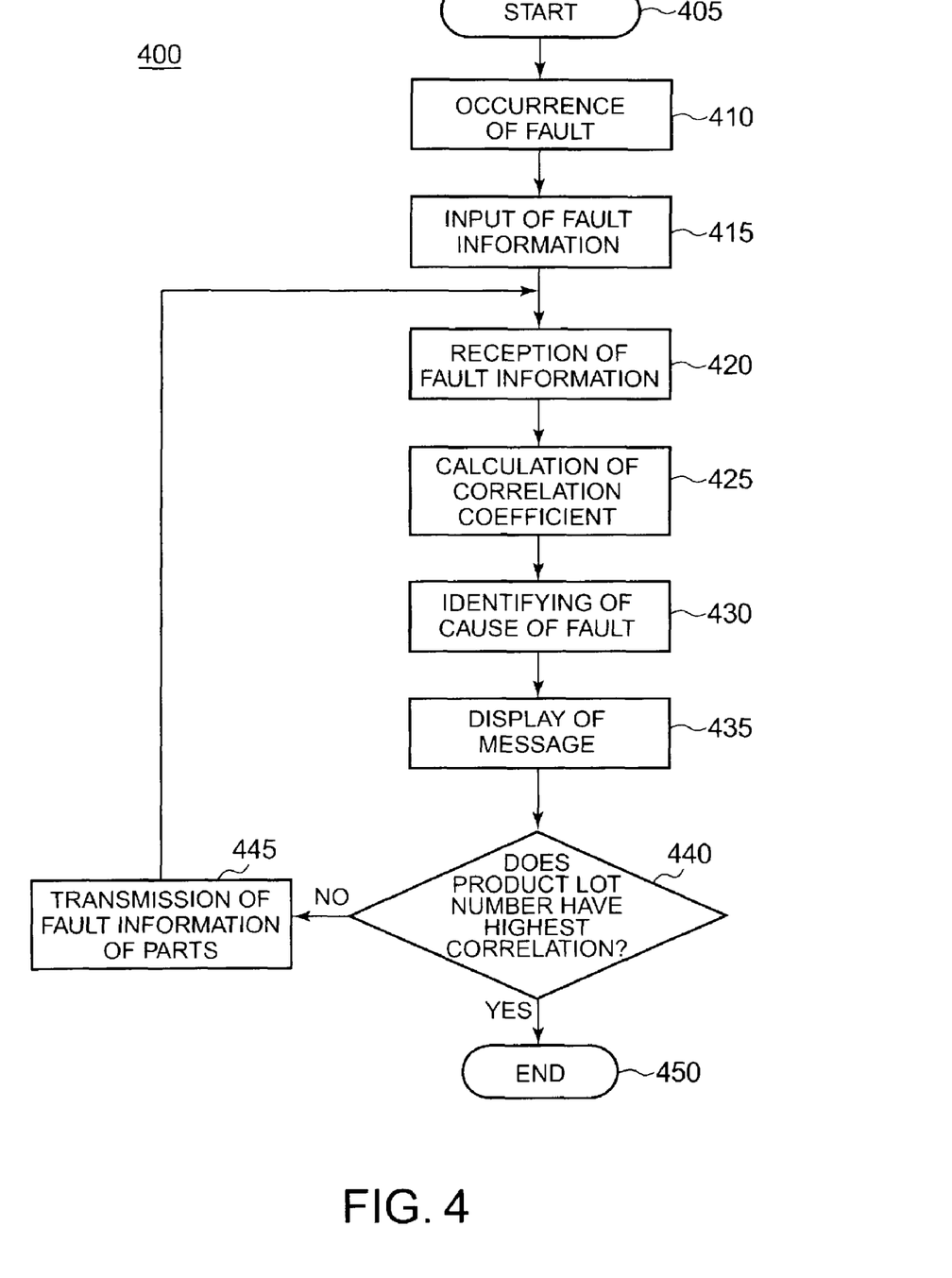
FIG. 4 is a flow chart for explaining operation when a fault is caused in a product of the system in an embodiment of the present invention.

FIG. 4 is a flow chart 400 representing the flow of the process for specifying the parts causing the fault in the system according to an embodiment of the present invention. The process is started at Step 405, and it is assumed that the specific phenomenon (specifically, fault) has occurred in part of the products sold to the consumers 105 at Step 410.

Next, the process proceeds to Step 415, and the fault information of the products caused at Step 410 is inputted into system 192. Specifically, the information required to specify the products in which the fault occurred (for example, the manufacturing number or serial number uniquely assigned to each product) is inputted as fault information.

Next, at Step 420, the fault information receiving section 235 of the system receives the fault information inputted at Step 415, and the fault information storage unit 240 stores the received fault information.

The process precedes to Step 425, and the correlation coefficient calculating unit 245 uses the parts lot number stored in the parts lot number storage unit 210 and the product lot number stored in the product lot number storage unit 220 to calculate the correlation coefficient indicating the degree of correlation between the fault products specified in the fault information stored in the fault information storage unit 240, and the group of parts having the common parts lot number and the group of products having the common product lot number. As an example, the correlation coefficient calculating unit 245 calculates the correlation coefficient by calculating the correlation coefficient R using the following equation in an embodiment of the present invention.

$$R = \Sigma_i (F_{spi}/L_{spi}) \quad \text{(Equation 1)}$$

Here, i is manufacturing number (serial number) of fault product,
spi is lot number of fault product i, or lot number of corresponding parts,
$F_{spi}$ is the number of fault products or the number of corresponding parts in the lot of lot number spi, and $L_{spi}$ is the number of products or parts included in the lot of lot number spi (lot size).

Figure 6:
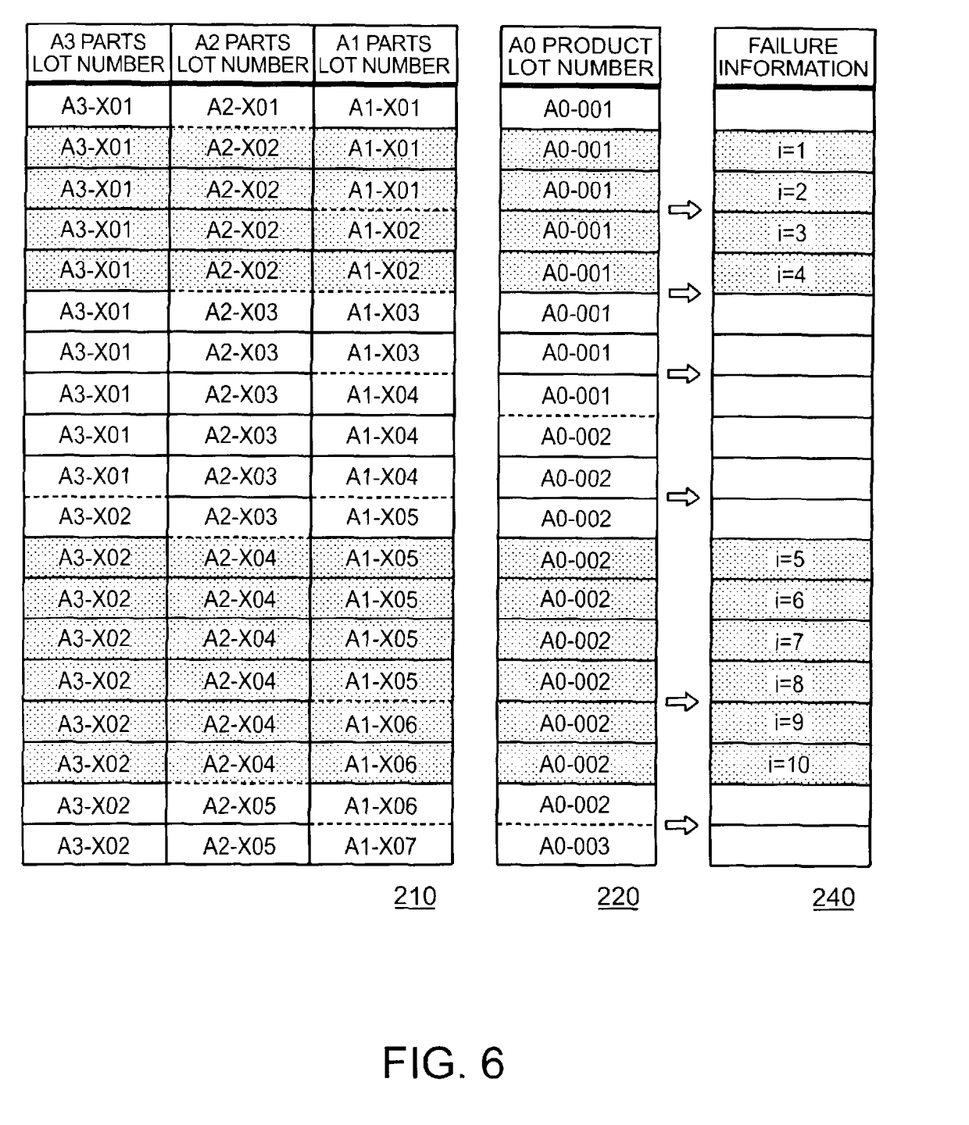
FIG. 6 is a diagram for explaining a calculation of a correlation coefficient in an embodiment of the present invention.

Calculation of the correlation coefficient R at Step 425 will be described taking a case where the data shown in FIG. 6 are stored in the parts lot number storage unit 210, the product lot number storage unit 220, and the fault information storage unit 240 of system 190 as an example.

In this case, the correlation coefficient for A0 is $R_{A0}=(4/8)*4+(6/10)*6=5.60$. The correlation coefficient for A1 is $R_{A1}=(2/3)*2+(2/2)*2+(4/5)*4+(2/3)*2=7.87$. The correlation coefficient for A2 is $R_{A2}=(4/4)*4+(6/6)*6=10.00$. The correlation coefficient for A3 is $R_{A3}=(4/10)*4+(6/9)*6=5.60$.

The process proceeds to Step 430, and the products or the parts are specified as the cause of the fault. Specifically, the products or the parts for which a maximum correlation coefficient is calculated at Step 425 are specified as the cause of the fault. In the example shown in FIG. 6, since the correlation coefficient for the parts A2 is the highest ($R_{A2}=10.00$), the parts A2 are specified as the cause of the fault.

Next, at Step 435, the message display unit 255 displays the information on the products or the parts that are determined to be the cause of the fault at Step 430 on a display device of the system in order to present it to the user for analysis of the cause of the fault. Moreover, the correlation coefficients of the products and the parts calculated at Step 425 are also displayed and presented to the user at Step 435. In the example shown in FIG. 6, it will be presented to the user that the cause of the fault is the parts/products A2, and the correlation coefficients of the parts/products A0, A1, A2, and A3 are $R_{A0}=5.60$, $R_{A1}=7.87$, $R_{A2}=10.00$, and $R_{A3}=5.60$.

The process proceeds to Step 440, and it is determined for which one between the products and the parts the maximum correlation coefficient is calculated. When it is determined that the correlation coefficient for specific parts is the highest at Step 440, the process proceeds to Step 445.

At Step 445, the fault information transmitting unit 260 transmits the fault information including the information for specifying the parts used in the products causing the fault to the system provided in the supplier which has produced such specific parts. The fault information will be transmitted to the system 172 of the supplier 170 that has produced the products A2 in the example shown in FIG. 6.

Next, the process proceeds to Step 420, and the fault information transmitted at Step 445 is received in the system of the lower level supplier. Steps 420 through 445 will be repeated in the system which receives the fault information.

When it is determined that the correlation coefficient of the products is the highest at Step 440, it is determined that there is the cause of the fault in the production process of the products (parts assembly, parts processing, matching between parts) in a supplier, and thus it is not necessary to send the fault information to the further lower level system. As a result, the process proceeds from Step 440 to Step 450 through the arrow of YES to be completed.

Figure 7:
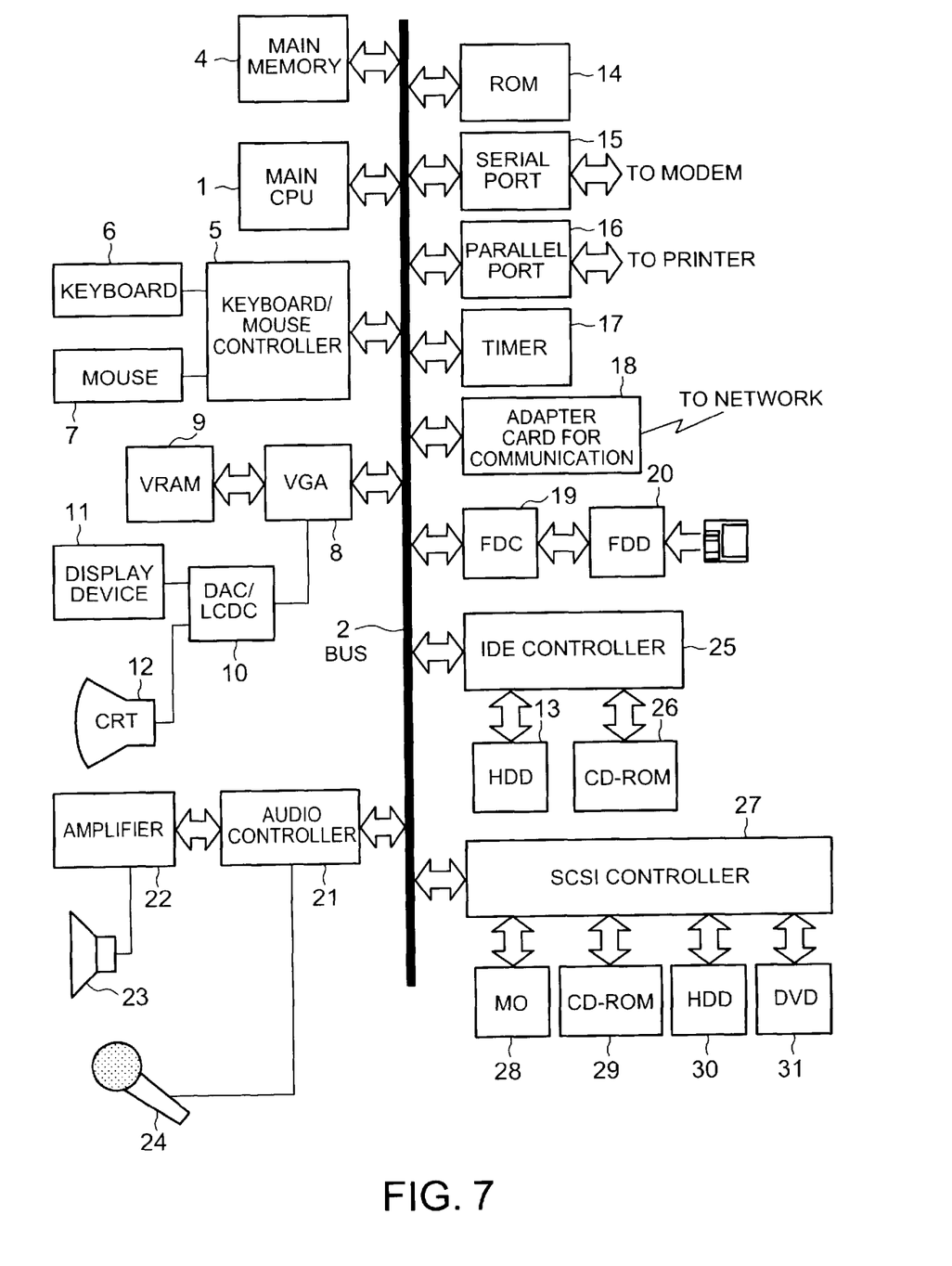
FIG. 7 is a diagram illustrating an example of a hardware configuration of an information processing apparatus suitable for achieving the system in an embodiment of the present invention.

FIG. 7 is a diagram illustrating an example of the hardware configuration of the information processing apparatus suitable for achieving the system according to an embodiment of the present invention. The information processing apparatus includes a central processing unit (CPU) 1 and a main memory 4 which are connected to a bus 2. Hard disk devices 13 and 30, and removable storage devices (external storage system having exchangeable recording media) such as a CD-ROM devices 26, 29, a flexible disk device 20, an MO device 28, and a DVD device 31 are connected to the bus 2 through a floppy disk controller 19, an IDE controller 25, an SCSI controller 27, and the like.

The storage media such as the flexible disk, MO, CD-ROM, and DVD-ROM are inserted in the removable storage device. It is possible to record a code of the computer program for providing a command to the CPU or the like in collaborating with an operating system to thereby carry out the present invention in these storage media and the hard disk devices 13, 30, and a ROM 14. The computer program is executed by being loaded to the main memory 4. The computer program can be compressed and can also be divided into a plurality of pieces to be recorded in a plurality of media.

The information processing apparatus receives an input from a keyboard 6 or an input device such as a mouse 7 via a keyboard/mouse controller 5. The information processing apparatus is connected to a display device 11 via a DAC/LCDC 10 for presenting visual data to the user.

It is possible to connect the information processing apparatus to the network via a network adapter 18 (an Ethernet® card or a token ring card) or the like to communicate with other computers or the like. Although not shown in the drawing, it is also possible to connect it to a printer through a parallel port, or to a modem through a serial port.

From the above description, it can be readily understood that the information processing apparatus suitable for achieving the system according to the embodiment of the present invention is achieved by the information processing apparatus, such as a usual personal computer, a workstation, and a mainframe, or a combination thereof. However, these units are illustrative and all the units are not necessarily essential for the present invention.

It is apparent that various modifications can be readily conceived by those skilled in the art, such as combining a plurality of machines and distributing functions to them for implementing the respective hardware units of the information processing apparatus used in an embodiment of the present invention. These changes are naturally in the concept included in the thought of the present invention.

The system according to an embodiment of the present invention can employ an operating system for supporting the graphical user interface (GUI) multi-window environment, such as a Windows® operating system provided by Microsoft Corporation, a MacOS® provided by Apple Computer Incorporated, or a UNIX® system provided with X Window System (for example, AIX® provided by International Business Machines Corporation).

As mentioned above, it will be understood that the system used in an embodiment of the present invention is not limited to a specific operating system environment. Namely, any operating systems may be used as far as application software or the like can provide a resource management function for allowing the resources of the data processing system to be used. Incidentally, while the resource management function can include a hardware resource management function, a file handle function, a spool function, a job management function, a memory protection function, a virtual-memory management function, or the like, detail description of these functions is omitted since they are well known to those skilled in the art.

The present invention can also be achieved as hardware, software, or a combination of the hardware and the software. In execution by the combination of the hardware and software, an illustrative example includes the execution in the data processing system having a predetermined program. In this case, by the predetermined program being loaded to the data processing system and executed, the program controls the data processing system and performs the processing according to the present invention. This program is constituted of a group of instructions which can be expressed by arbitrary language, code, and notations. Such a group of instructions allows the system to execute a certain function directly or after either or both of (1) conversion to a different language, code, or notation, and (2) duplication to a different medium is carried out.

The present invention apparently includes not only such a program itself but also the medium which has recorded the program in its scope. The program for performing the function of the present invention can be stored in any computer-readable recording media such as a flexible disk, MO, CD-ROM, DVD, hard disk device, ROM, MRAM, RAM or the like. The program can be downloaded from other data processing systems connected via a communication line or reproduced from other recording media for storing in the recording medium. The program can also be compressed or divided into a plurality of pieces to be stored in a single recording medium or multiple recording media. In addition, it should be noted that the program product for carrying out the present invention could be apparently provided in various forms as well.

As mentioned above, according to an embodiment of the present invention, it will be easily understood that a traceability system capable of efficiently identifying the phenomenon caused in the product, specifically speaking the cause of the fault, can be constructed with fewer computer resources.

It is apparent to those skilled in the art that various modifications or improvements can be made to the embodiments described above. For example, while the production process chain according to an embodiment to the present invention is achieved as the production process chain with three levels, it obviously can be expanded to a production process chain with any number of levels. It should be noted that the mode to which such a modification or improvement is added is also included in the technical scope of the present invention.

What is claimed is:

1. A computer system for assigning virtual attributes to a product produced in a production process chain, the production process chain including a first supplier producing one or more first products, a second supplier being a higher level supplier than the first supplier using said one or more first products produced by said first supplier and producing one or more second products, and a third supplier being a higher level supplier than said second supplier using said one or more second products produced by said second supplier and producing third products, said computer system comprising:
   a memory storage unit for storing: first attribute values assigned to first lot numbers of said one or more first products; second attribute values assigned to second lot numbers of said one or more second products; and third lot number attribute values assigned to said third products; and
   a computerized generation unit for generating: first virtual lot number attribute values combining each of said second lot number attribute values and one or more of said first lot number attribute values; and second virtual lot number attribute values combining each of said third lot number attribute values and one or more of said second lot number attribute values;
   a system for tracing a fault occurring in said third lot number attribute values of said third products, said system for tracing comprising:
   a correlation calculation unit for calculating a correlation coefficient between each of said third lot number attribute values of said third products having said fault and said second virtual lot number attribute values including a third lot number attribute value having said fault and a second lot number attribute value; and
   a sub-processor for identifying one of said one or more second lot number attribute values of said second products as having a largest correlation coefficient identifying said one of said one or more second lot number attribute values of said second products being associated with said fault.

2. The computer system according to claim 1, said storage unit further storing said first lot number virtual attribute values.

3. The computer system according to claim 1, further comprising a receiving unit for receiving said one or more of said first attribute lot number values from another system through a network.

4. The computer system according to claim 1, said generation unit transmitting said first virtual lot number attribute values to another system through a network.

5. The computer system according to claim 1, further comprising a transmission unit for transmitting said one of said one or more second lot number attribute values of said second products identified by said cause identification unit and used in said third lot number attribute values of said third products in which said fault has occurred to another system through a network.

6. The computer system according to claim 1, further comprising a display unit for displaying said second lot number attribute values of said second products identified by said cause identification unit.

7. A computer-implemented method for assigning virtual attributes to a product produced in a production process chain, said production process chain including a first supplier producing one or more first products, a second supplier being a higher level supplier than said first supplier using said one or more first products produced by said first supplier and producing one or more second products, and a third supplier being a higher level supplier than said second supplier using said one or more second products produced by said second supplier and producing third products, the method comprising:
   storing, by a computer, first attribute values assigned to first lot numbers of said one or more first products, second attribute values assigned to second lot numbers of said one or more second products, and third lot number attribute values assigned to said third products;
   generating, by said computer, first virtual lot number attribute values combining each of said second lot number attribute values and one or more of said first lot number attribute values, and second virtual lot number attribute values combining each of said third lot number attribute values and one or more of said second lot number attribute values;

calculating, by said computer, a correlation coefficient between each of said third lot number attributes values of said third products having a fault and said second virtual lot number attribute values including a third lot attribute value having said fault and a second lot number attribute value; and identifying, by said computer, one of said one or more second products as having a largest correlation coefficient, identifying said one of said one or more second lot number attribute values of said second products being associated with said fault.

8. A non-transitory computer program storage device, readable by computer, tangibly embodying a program of instructions executable by said computer to perform a method for assigning virtual attributes to a product produced in a production process chain, said production process chain including a first supplier producing one or more first products, a second supplier being a higher level supplier than said first supplier using said one or more first products produced by said first supplier and producing one or more second products, and a third supplier being a higher level supplier than said second supplier using said one or more second products produced by said second supplier and producing third products; said method comprising:

storing first attribute values assigned to first lot numbers of said one or more first products second attribute values assigned to second lot numbers of said one or more second products, second attribute values assigned to second lot numbers of said one or more second products, and third lot number attribute values assigned to said third products;

generating first virtual lot number attribute values combining each of said second lot number attribute values and one or more of said first lot number attribute values, and second virtual lot number attribute values combining each of said third lot number attribute values and one or more of said second lot number attribute values;

calculating a correlation coefficient between each of said third lot number attribute values of said third products having a fault and said second virtual lot number attribute values including a third lot attribute value having a fault and a second lot number attribute value; and identifying said one of said one or more second products as having a largest correlation coefficient, identifying said one of said one or more second lot number attribute values of said second products being associated with said fault.

* * * * *